US010652046B1

(12) United States Patent
Skobodzinski et al.

(10) Patent No.: US 10,652,046 B1
(45) Date of Patent: May 12, 2020

(54) INFRASTRUCTURE SUPPORT IN CLOUD ENVIRONMENTS

(71) Applicant: Microsoft Technology Licensing, LLC, Redmond, WA (US)

(72) Inventors: Anna Skobodzinski, New York, NY (US); Lamia Youseff, Stanford, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/191,252

(22) Filed: Nov. 14, 2018

(51) Int. Cl.
 *G06F 15/173* (2006.01)
 *H04L 12/44* (2006.01)
 *H04L 29/08* (2006.01)

(52) U.S. Cl.
 CPC .......... *H04L 12/44* (2013.01); *H04L 67/1091* (2013.01)

(58) Field of Classification Search
 CPC ................... H04L 12/44; H04L 67/1091
 See application file for complete search history.

(56) References Cited

U.S. PATENT DOCUMENTS

| | | | | |
|---|---|---|---|---|
| 7,447,901 B1* | 11/2008 | Sullenberger | ....... | H04L 63/0272 713/153 |
| 7,450,598 B2* | 11/2008 | Chen | ................... | H04L 12/4641 370/254 |
| 7,774,500 B1* | 8/2010 | D'Souza | ............ | H04L 41/5064 709/220 |
| 7,848,259 B2* | 12/2010 | Gray | ................... | H04L 41/5058 370/255 |
| 8,625,465 B1* | 1/2014 | Aggarwal | ............... | H04L 12/18 370/255 |
| 10,057,334 B2* | 8/2018 | Choi | ................... | H04L 61/2007 |
| 2010/0188983 A1 | 7/2010 | Washam et al. | | |
| 2010/0284302 A1* | 11/2010 | Proulx | ................ | H04L 41/0806 370/254 |

(Continued)

FOREIGN PATENT DOCUMENTS

| | | |
|---|---|---|
| WO | 2013120406 A1 | 8/2013 |
| WO | 2015027904 A1 | 3/2015 |
| WO | 2015153103 A1 | 10/2015 |

OTHER PUBLICATIONS

Virtual network traffic routing—Microsoft Docs dated Oct. 26, 2017 per applicant submitted NPL documentation; (https://docs.microsoft.com/en-us/azure/virtual-network/virtual-networks-udr-overview) (Year: 2017).*

(Continued)

*Primary Examiner* — Sithu Ko
*Assistant Examiner* — Malick A Sohrab
(74) *Attorney, Agent, or Firm* — Newport IP, LLC; Han Gim (57) ABSTRACT

Techniques are disclosed for implementing networks in a virtualized computing environment. One or more spoke virtual networks are instantiated and connected to a first virtual network hub to form a first hub and spoke topology. One or more spoke virtual networks are instantiated and connected to a second hub virtual network to form a second hub and spoke topology. A virtual connection is established from the first virtual network hub to the second hub virtual network. The first and second hub and spoke networks are allocated to a user of the virtualized computing environment.

20 Claims, 8 Drawing Sheets

(56) References Cited

U.S. PATENT DOCUMENTS

| | | | |
|---|---|---|---|
| 2015/0319043 A1* | 11/2015 | Dibirdi | H04L 41/0806 370/254 |
| 2016/0043967 A1 | 2/2016 | Jacob et al. | |
| 2016/0277250 A1 | 9/2016 | Maes | |
| 2016/0366213 A1* | 12/2016 | Kazanchian | H04W 76/25 |
| 2019/0036776 A1* | 1/2019 | Smith | H04L 45/64 |

OTHER PUBLICATIONS

Dial, et al., "Tutorial: Connect virtual networks with virtual network peering using the Azure portal", Retrieved from: https://docs.microsoft.com/en-us/azure/virtual-network/tutorial-connect-virtual-networks-portal, Aug. 16, 2018, 8 Pages.

Dial, et al., "Virtual network peering", Retrieved from: https://docs.microsoft.com/en-us/azure/virtual-network/virtual-network-peering-overview, Aug. 16, 2018, 5 Pages.

Dial, et al., "Virtual network traffic routing", Retrieved from: https://docs.microsoft.com/en-us/azure/virtual-network/virtual-networks-udr-overview, Oct. 26, 2017, 14 Pages.

McGuire, et al., "Create a Site-to-Site connection in the Azure portal", Retrieved from: https://docs.microsoft.com/en-us/azure/vpn-gateway/vpn-gateway-howto-site-to-site-resource-manager-portal?toc=%2fazure%2fvirtual-network%2ftoc.json, Apr. 4, 2018, 16 Pages.

McGuire, et al., "What is VPN Gateway?", Retrieved from: https://docs.microsoft.com/en-us/azure/vpn-gateway/vpn-gateway-about-vpngateways?toc=%2fazure%2fvirtual-network%2ftoc.json#V2V, Apr. 19, 2018, 10 Pages.

Roth, et al., "Azure subscription and service limits, quotas, and constraints", Retrieved from: https://docs.microsoft.com/en-us/azure/azure-subscription-service-limits#storage-limits, Sep. 11, 2018, 60 Pages.

Sampaio, et al., "Implement a hub-spoke network topology in Azure", Retrieved from: https://docs.microsoft.com/en-us/azure/architecture/reference-architectures/hybrid-networking/hub-spoke, Apr. 9, 2018, 10 Pages.

"International Search Report and Written Opinion Issued in PCT Application No. PCT/US19/059573", dated Feb. 3, 2020, 13 Pages.

* cited by examiner

INFRASTRUCTURE SUPPORT IN CLOUD ENVIRONMENTS

BACKGROUND

A data center is a facility that houses computer systems and various networking, storage, and other related components. Data centers may, for example, provide computing services to businesses and individuals as a remote computing service or provide "software as a service" (e.g., cloud computing).

To facilitate efficient utilization of data center resources, virtualization technologies allow a physical computing device to host one or more virtual machines (VM) that appear and operate as independent computer devices to a connected user. The data center can create, maintain or delete virtual machines in a dynamic manner.

Many enterprises utilize virtualization technologies that include virtual network peering to provide connected yet secure workspaces for their business units or lines of business (LOB). Virtual machine peers may be directly linked to each other within a virtual network using private IP addresses. Besides the fact that no virtual private network (VPN) gateway is needed, virtual network peering enables large organizations to give teams managed access to virtualized resources. For example, organizations can create peered links within a region, allowing communication to cross the isolation of virtual networks so that common services and policies can be shared.

However, when enterprises expand their networks in the virtualized environment, limitations may be encountered. For example, the virtualization service provider may have a limit for the number of peering links that are supported. Organizations may need to provide isolation between various LOBs within the organization, and may host each LOB in its own virtual network and use virtual network peering to provide connections between peers. Many enterprises use a mesh network to support connection requirements. However, when enterprises attempt to replicate their networks in the virtualized environment, the limit of the number of peering links that are supported may prevent their expansion from traditional systems to the virtualized environment without significant rearchitecting and cost. For example, an enterprise can have up to 100 LOBs, requiring 5000 peering links to migrate the corresponding mesh network to the virtualized environment.

It is with respect to these considerations and others that the disclosure made herein is presented.

SUMMARY

The disclosed embodiments describe technologies for allowing enterprise lines of business (LOBs) to scale their networks to the cloud and thus enable the migration of their networks from on-premises data centers to virtualized systems in the cloud. In some embodiments, virtual network peering and a hub and spoke architecture may be implemented.

In one example scenario, an enterprise user may migrate networks of various LOBs to the cloud, each of which may be composed of one or more projects, and which may each require a mesh network topology to provide connectivity among the various LOBs and other services. Each project may further comprise a number of environments such as development, production, staging, and other environments, and where each environment may require its own virtual network. Additionally, each environment may further comprise a frontend subnet, middle-tier, subnet, and a backend subnet. As such, an enterprise may leverage virtual networks and their subnets as fine-grained isolation boundaries between different environments to meet compliance requirements. Virtual network peering limits may constrain deployment of such networks. Development of alternative solutions may be costly and require trade-offs in deployment complexity. Furthermore, LOBs may need to have access to other LOBs as well as virtual networks connecting back to the enterprise. To achieve such connectivity, a first solution may be to create a mesh network architecture between the various virtual networks. However, such a mesh network requires a large number of virtual network to virtual network peering links which may be directly proportional to the number of virtual networks and the number of LOBs.

In various embodiments, techniques are described for transforming a mesh network to a hub and spoke network that can be hosted in the virtualized environment. By providing such a mechanism for onboarding mesh networks to a virtualized environment, limitations on virtual network interconnections can be reduced, allowing for virtualized services to be implemented more efficiently for users needing mesh networks and other scenarios where a greater number of interconnections are desired.

In one embodiment, a first virtual network hub can be implemented that includes a first central virtual network that has a direct virtual connection to a number of spoke virtual networks that form a first hub and spoke, the number which can be determined in accordance with constraints for the data center. The first virtual network hub may have a direct virtual connection to a second hub virtual network that includes a second central virtual network that has a direct virtual connection to a number of spoke virtual networks that form a second hub and spoke. Any spoke virtual network in the first or second hub and spoke may form a virtual connection with any other virtual network in the first or second hub and spoke by virtue of the central virtual networks being connected. Communication from spokes may be facilitated through the hubs, which are connected as peered networks. The spokes can be configured to communicate through the hubs. In this way, the hub and spoke eliminates the need for the spokes to be directly connected with each other. This pattern may be continued in a linear fashion to allow for formation of large numbers of hub and spoke groupings that can topologically support mesh networks of arbitrary size. In this way, previous limits on connections between virtual networks can be avoided while allowing for users with multiple LOBs to migrate their mesh topologies to a virtualized cloud environment without rearchitecting their software architecture and/or applications. Users with multiple LOBs may also support their mesh topologies in the virtualized cloud environment in a way that allows for scalable growth while providing efficient use of data center resources.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the description detailed herein, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

Described herein are methods and systems for enabling users such as enterprises to support multiple lines of business (LOB) in a virtualized environment. In various embodiments, techniques are described for hosting a hub and spoke topology in a virtualized environment that allows for a data center to onboard highly interconnected networks such as a mesh network to a virtualized environment while avoiding limitations on virtual network interconnections. The hub and spoke virtual network topology allows for virtualized services to be implemented for users with multiple LOBs that require a many-to-many topology such as a mesh network. While the present disclosure describes many example embodiments in the context of a mesh network, the disclosed methods and systems may be implemented with other topologies that feature multiple virtual connections.

Figure 1:
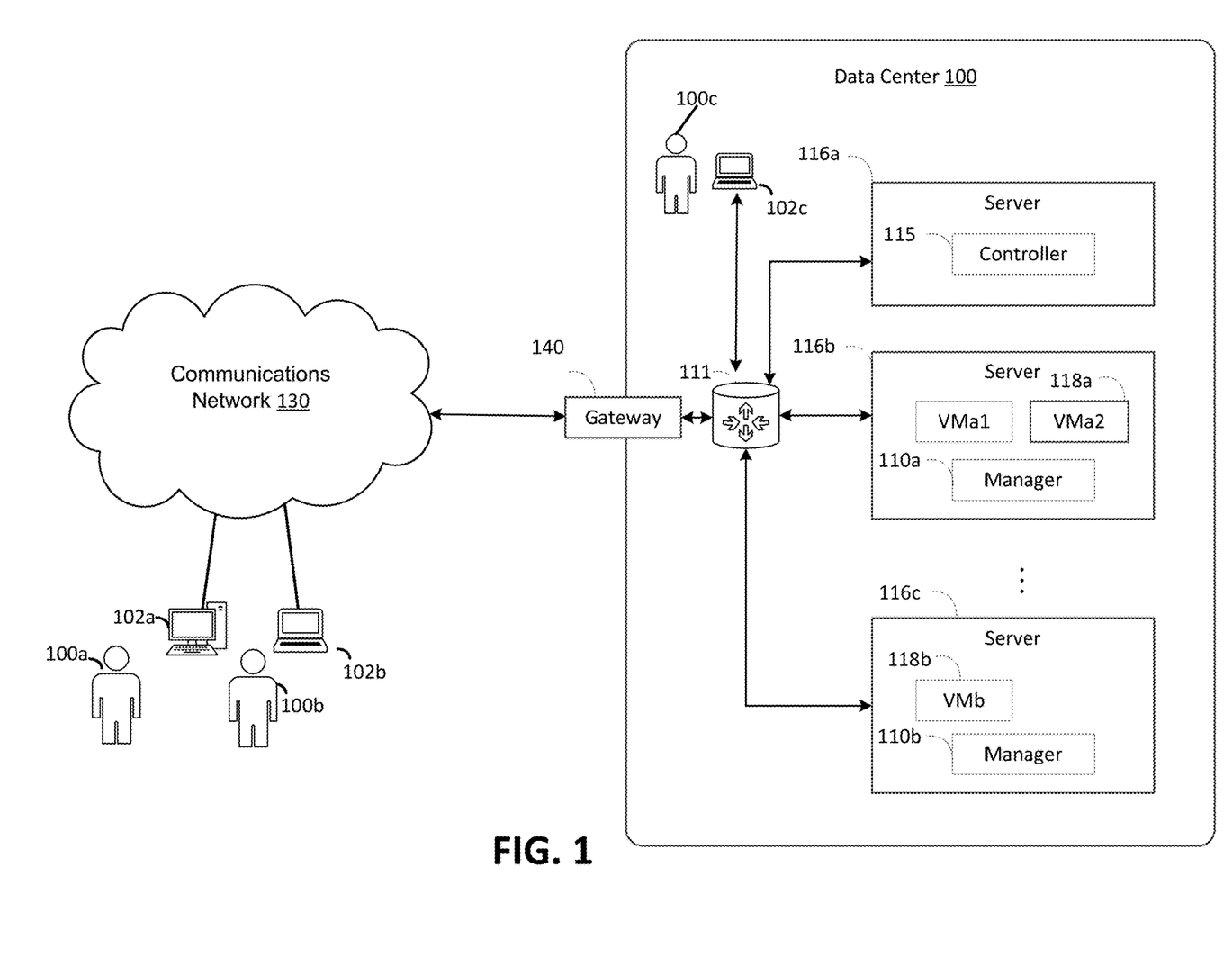
FIG. 1 is a diagram illustrating a data center in accordance with the present disclosure.

FIG. 1 illustrates an example computing environment in which the embodiments described herein may be implemented. FIG. 1 illustrates a data center 100 that is configured to provide computing resources to users 100a, 100b, or 100c (which may be referred herein singularly as "a user 100" or in the plural as "the users 100") via user computers 102a, 102b, and 102c (which may be referred herein singularly as "a computer 102" or in the plural as "the computers 102") via a communications network 130. The computing resources provided by the data center 100 may include various types of resources, such as computing resources, data storage resources, data communication resources, and the like. Each type of computing resource may be general-purpose or may be available in a number of specific configurations. For example, computing resources may be available as virtual machines. The virtual machines may be configured to execute applications, including Web servers, application servers, media servers, database servers, and the like. Data storage resources may include file storage devices, block storage devices, and the like. Each type or configuration of computing resource may be available in different configurations, such as the number of processors, and size of memory and/or storage capacity. The resources may in some embodiments be offered to clients in units referred to as instances, such as virtual machine instances or storage instances. A virtual computing instance may be referred to as a virtual machine and may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

Data center 100 may include servers 116a, 116b, and 116c (which may be referred to herein singularly as "a server 116" or in the plural as "the servers 116") that provide computing resources available as virtual machines 118a and 118b (which may be referred to herein singularly as "a virtual machine 118" or in the plural as "the virtual machines 118"). The virtual machines 118 may be configured to execute applications such as Web servers, application servers, media servers, database servers, and the like. Other resources that may be provided include data storage resources (not shown on FIG. 1) and may include file storage devices, block storage devices, and the like. Servers 116 may also execute functions that manage and control allocation of resources in the data center, such as a controller 115. Controller 115 may be a fabric controller or another type of program configured to manage the allocation of virtual machines on servers 116.

Referring to FIG. 1, communications network 130 may, for example, be a publicly accessible network of linked networks and may be operated by various entities, such as the Internet. In other embodiments, communications network 130 may be a private network, such as a corporate network that is wholly or partially inaccessible to the public.

Communications network 130 may provide access to computers 102. Computers 102 may be computers utilized by users 100. Computer 102a, 102b or 102c may be a server, a desktop or laptop personal computer, a tablet computer, a smartphone, a set-top box, or any other computing device capable of accessing data center 100. User computer 102a or 102b may connect directly to the Internet (e.g., via a cable modem). User computer 102c may be internal to the data center 100 and may connect directly to the resources in the data center 100 via internal networks. Although only three user computers 102a, 102b, and 102c are depicted, it should be appreciated that there may be multiple user computers.

Computers 102 may also be utilized to configure aspects of the computing resources provided by data center 100. For example, data center 100 may provide a Web interface through which aspects of its operation may be configured through the use of a Web browser application program executing on user computer 102. Alternatively, a stand-alone application program executing on user computer 102 may be used to access an application programming interface (API) exposed by data center 100 for performing the configuration operations.

Servers 116 may be configured to provide the computing resources described above. One or more of the servers 116 may be configured to execute a manager 120a or 120b (which may be referred herein singularly as "a manager 120" or in the plural as "the managers 120") configured to execute the virtual machines. The managers 120 may be a virtual machine monitor (VMM), fabric controller, or another type of program configured to enable the execution of virtual machines 118 on servers 116, for example.

It should be appreciated that although the embodiments disclosed above are discussed in the context of virtual machines, other types of implementations can be utilized with the concepts and technologies disclosed herein.

In the example data center 100 shown in FIG. 1, a network device 111 may be utilized to interconnect the servers 116a and 116b. Network device 111 may comprise one or more switches, routers, or other network devices. Network device 111 may also be connected to gateway 140, which is connected to communications network 130. Network device 111 may facilitate communications within networks in data center 100, for example, by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 1 has been greatly simplified and that many more networks and networking devices may be utilized to interconnect the various computing systems disclosed herein. These network topologies and devices should be apparent to those skilled in the art.

It should also be appreciated that data center 100 described in FIG. 1 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, PDAs, tablets, smartphone, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Figure 2:
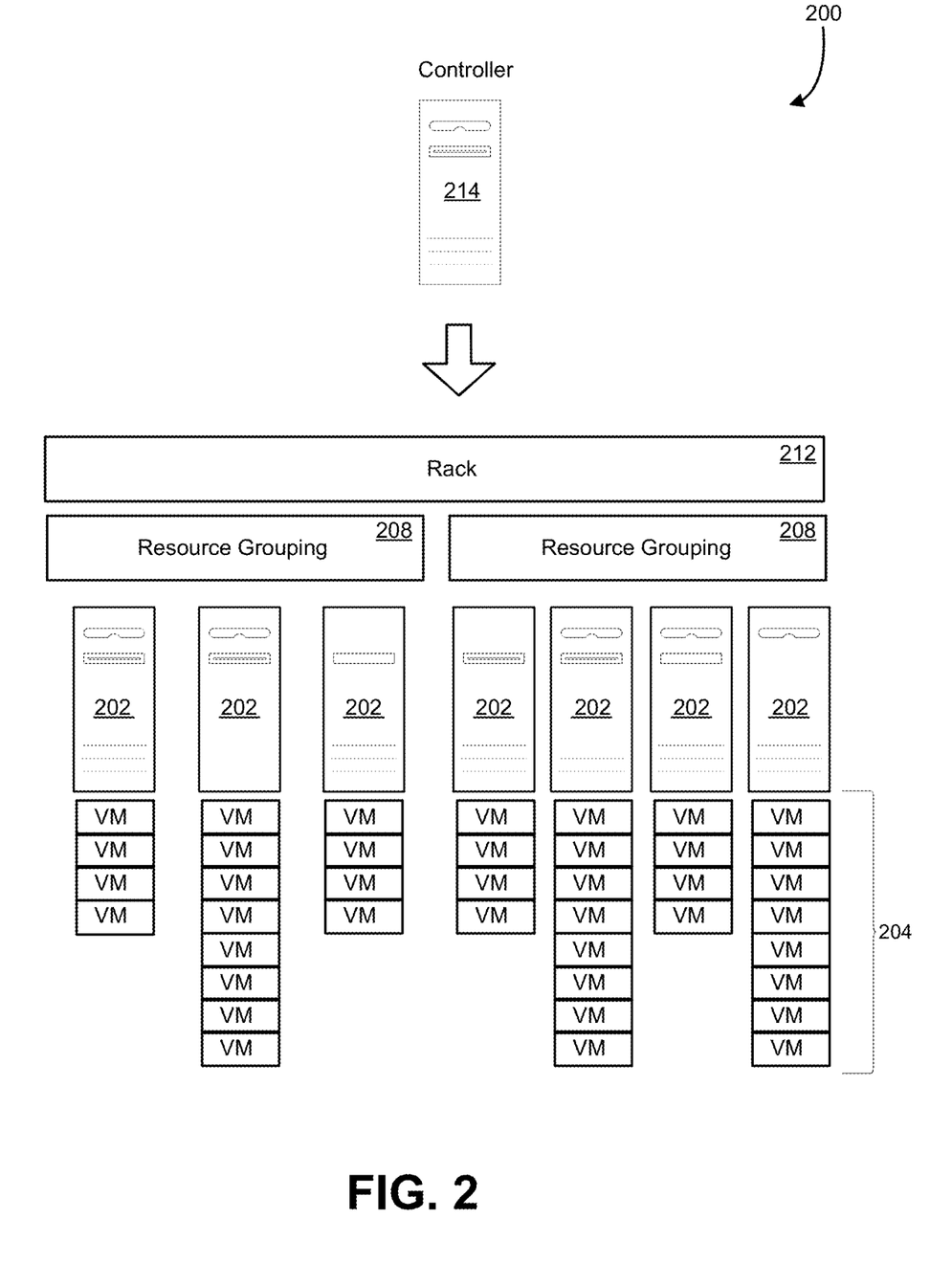
FIG. 2 is a diagram illustrating virtual machine instances in accordance with the present disclosure.

In some embodiments, such as in FIG. 2, illustrated is a data center 200 that may be viewed as a collection of shared computing resources and shared infrastructure. For example, as shown in FIG. 2, a data center 200 may include virtual machine containers 204, physical hosts 202, logical groupings 208, and data center 212. A virtual machine container 204 may be referred to as a virtual machine slot. The physical hosts 202 may vary in hardware and/or software configurations and thus may not be identical whether they are on the same physical rack or data center. A physical host 202 may be shared by multiple virtual machine containers 204, each container 204 being capable of hosting a virtual machine. Multiple physical hosts 202 may share resources such as a power supply (not shown on FIG. 2) provided on data center 212. Data center 212 may also include one or more routers (also not shown on FIG. 2) which may service multiple physical hosts 202 to route network traffic. A controller or provisioning server 214 may include a memory and processor configured with instructions to manage workflows for provisioning and de-provisioning computing resources as well as detecting health and/or failure of computing resources. A provisioning server 214 may determine a placement of a resource within the data center. In some embodiments, this placement may be based at least in part on available computing resources and/or relationships between computing resources.

Figure 3:
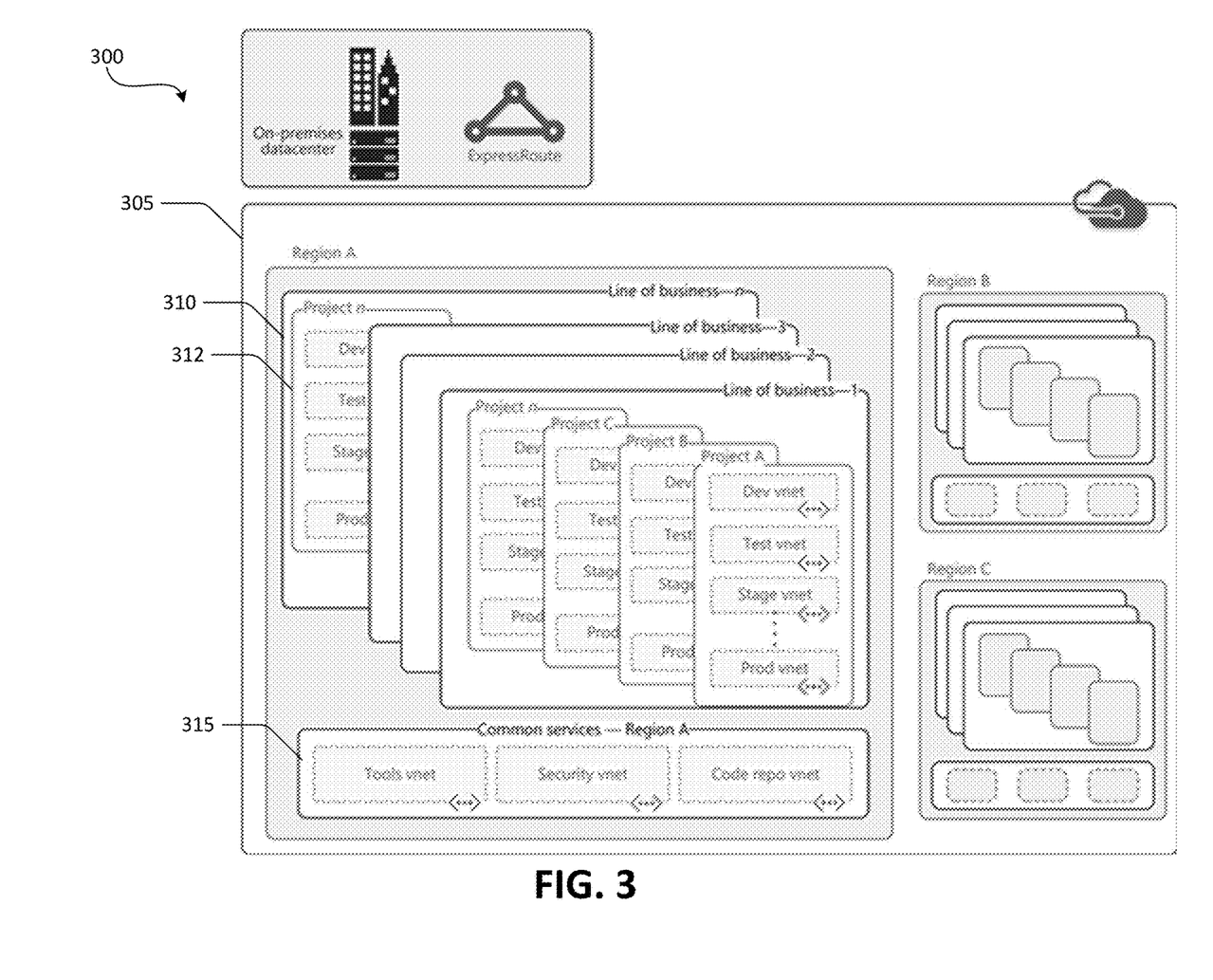
FIG. 3 is a diagram illustrating an enterprise network.

FIG. 3 illustrates an example of a large-scale enterprise 300 that deploys a plurality of LOBs 310 running a number of projects 312 that may each run a number of virtual networks. The LOB virtual networks may need access to other LOBs as well as other common services that may be served via a mesh network. As shown in FIG. 3, business units may need access to other lines of business, the datacenter on premises, and a common services virtual network 315 used to host services shared by the organization. For example, in one region, an enterprise might have a number of lines of business (LOB), and each business unit may run within a virtual network with its own development, testing, staging, and production environment, that in turn share a source code repository, developer tools, security, and other resources.

Using virtual network peering, a mesh topology may be implemented to ensure that all peers have access to all other peers. Some organization may solve their need for network isolation and connectivity by creating a mesh network architecture among the various virtual networks. In a mesh network, all nodes in the network are interconnected, so network traffic may be fast and can be easily redirected as needed. The disadvantage of a mesh topology is that it creates redundant connections, making it costly to operate and manage as compared to other topologies. Furthermore, the number of peering links required may quickly reach the limits of a datacenter as the following table shows. The number of virtual network peering links grows exponentially based on the number of virtual networks and business units.

| Number of virtual networks | 10 | 20 | 50 | 100 |
|---|---|---|---|---|
| Peering links required | 45 | 190 | 1,225 | 4,950 |

In various embodiments, an on-premises mesh network may be transformed to a hub and spoke network that can be hosted in a virtualized environment. By onboarding mesh networks to a virtualized environment in this way, limitations on virtual network interconnections can be reduced, allowing for virtualized services to be implemented efficiently for users needing mesh networks and other scenarios where a greater number of interconnections are desired.

In one embodiment, a first virtual network hub can be implemented that includes a first central virtual network that has a direct virtual connection to a number of spoke virtual network that form a first hub and spoke, the number which can be determined in accordance with constraints for the data center. The first virtual network hub may have a direct virtual connection to a second virtual network hub that includes a second central virtual network that has a direct virtual connection to a number of spoke virtual networks that form a second hub and spoke. Any spoke virtual network in the first or second hub and spoke may form a virtual connection with any other virtual network in the first or second hub and spoke by virtue of the central virtual networks being connected. This pattern may be continued in a linear fashion to allow for formation of large numbers of hub and spoke groupings that can topologically support mesh networks of arbitrary size.

In this way, previous limits on connections between virtual networks can be avoided while allowing for users with multiple LOBs to migrate their mesh topologies to a virtualized cloud environment without rearchitecting their topologies. In one scenario enabled by the described hub and spoke virtual network topology, each LOB may manage its own service subscription, enable teams to independently work on projects while maintaining multiple isolated environments such as development, production, and staging environments. Each of these environments may be assigned in its own virtual network. Atypical environment may be composed of one or more subnets such as a front-end subnet, middle tier, and back-end subnet, which may provide greater control over isolation boundaries.

Figure 4:
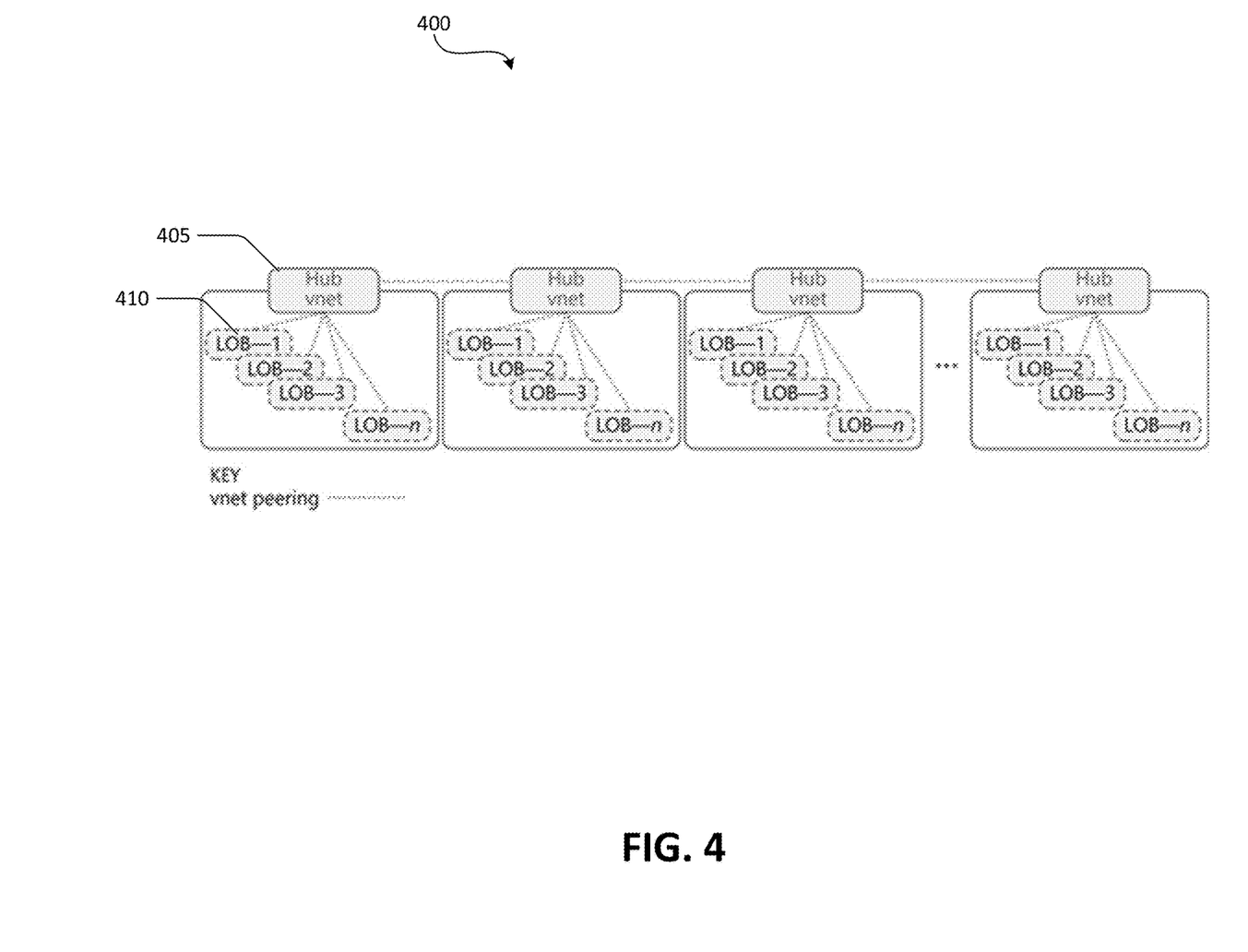
FIG. 4 is a diagram illustrating aspects of virtual network hubs in accordance with the present disclosure.

In some embodiments, virtual networks 405 can be chained as shown in FIG. 4 to aggregate resources in hubs 405 that can be shared by the spokes 410 in the network. Virtual network chaining makes it easy to add and remove spokes without affecting the rest of the network, which gives business units greater flexibility within their environments. Virtual network chaining also supports centralized monitoring and management. In addition, hubs may aggregate connections to avoid reaching the peering link limit. In some embodiments, network traffic may be directed using network security groups that specify rules to allow or deny traffic and user-defined routes that control the routing of packets.

Virtual network chaining may also support a layered approach to isolation, for example deploying one virtual network per project environment to improve security. A chaining model may enable the hosting of each development, test, staging, and production environment in its own virtual network.

Figure 5:
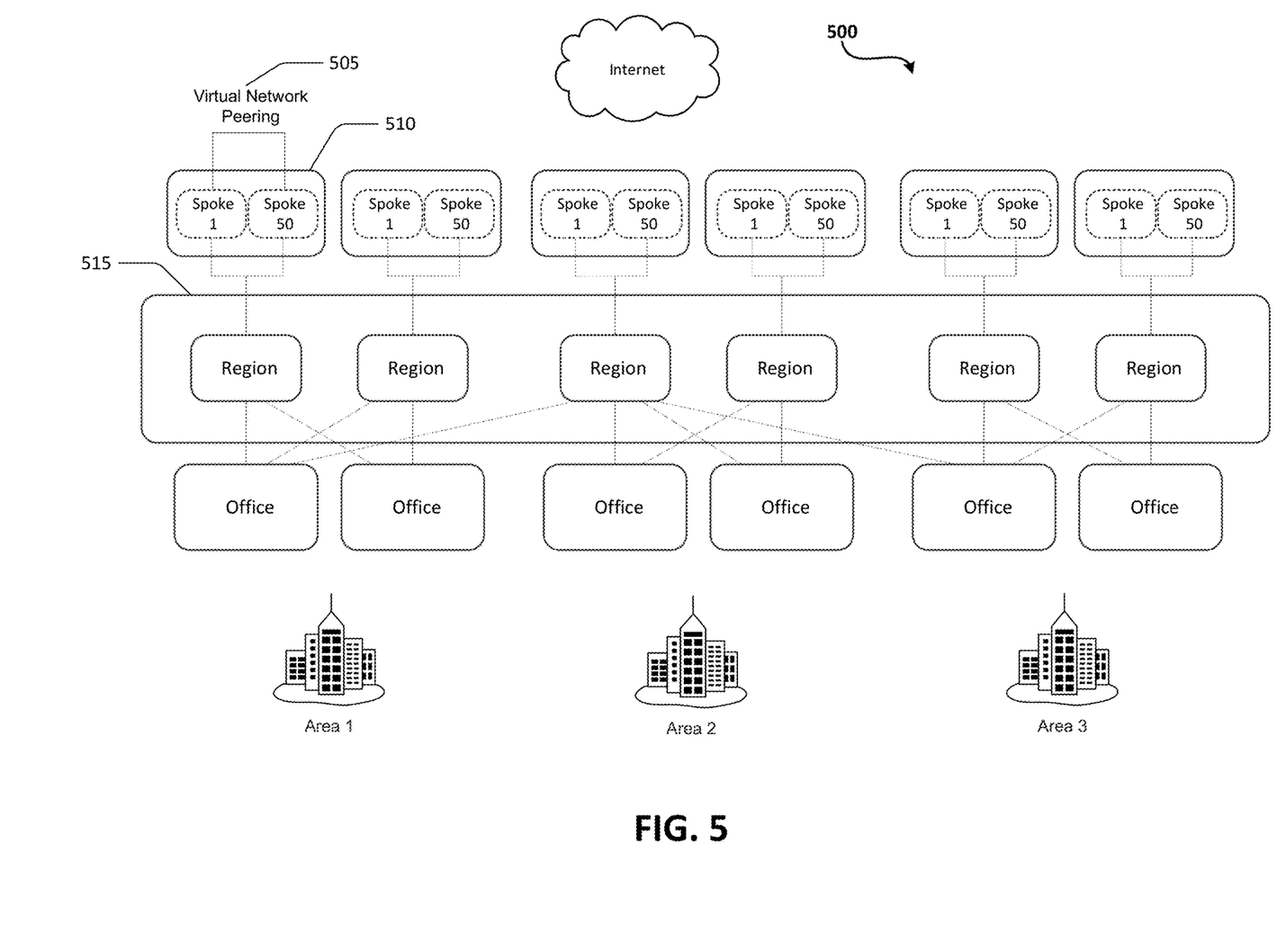
FIG. 5 is a diagram illustrating an example hub and spoke implementation in accordance with the present disclosure.

In one example embodiment depicted in FIG. 5, a hub and spoke architecture 500 may be implemented to support projects deployed by multiple business units that access the same data. In this model, each region 515 has its own datacenter, and projects may be deployed across regions. For example, a business unit may have a project to analyze global customer data. The team may deploy their solution in their own virtual network spoke, which is connected to the regional virtual network hub. The hub network includes shared services such as identity management and is connected to the regional datacenter on premises, where the other centrally managed services reside. In one example, deployments may be made across regional pairs. Dedicated virtual circuits may be implemented to facilitate communications between selected regions or regional cross-connections per continent. A selected number of virtual network hubs may be implemented per region, for example one virtual network hub per deployment type. Each hub may have to a specified number of spokes connected by virtual network peering. With this architecture, the enterprise can constrain their virtual network peering links to the levels that are supported by the service provider of the virtual environment. networks are deployed.

In some embodiments, isolation boundaries may be implemented for greater access control across a large ecosystem of virtual machines. In one example, Role-Based Access Control (RBAC) may be implemented to regulate access to resources based on the roles of users within an enterprise. Additionally, resource manager policies may be established at the project level. RBAC may define the scope of user activities by segregating duties and granting access to resources based on need. For example, one role can be permitted to manage the virtual network and everything within it, while another role might manage only a single resource such as a SQL Database. Similarly, resource manager policies may set limits on resources and support deployment conventions. An operations team, for instance, might specify that only certain types of virtual machines or subnets are allowed. Enterprises may use a combination of RBAC and policies to reduce the number of virtual network peering links in this topology so that they do not exceed limits for a given data center.

By providing a hub and spoke architecture for peered networks, LOBs may be provided isolation for projects as needed while also allowing access to shared resources. The improvements and efficiencies provide for greater usability, allowing for flexible and scalable highly connected virtual networks in a data center while efficiently utilizing the computing resources of the data center. The disclosed techniques may be implemented in any type of networked environment, including those that provide virtualized computing and network resources. In one example implementation, a hub and spoke implementation may be implemented to enable a blockchain. For example, in one implementation, one hub can be allocated per participant. In another example implementation, in a combination scenario such as a merger and acquisition scenario, different networks may be migrated at different times, using the hub and spoke to preserve access controls for the different networks.

Figure 6:
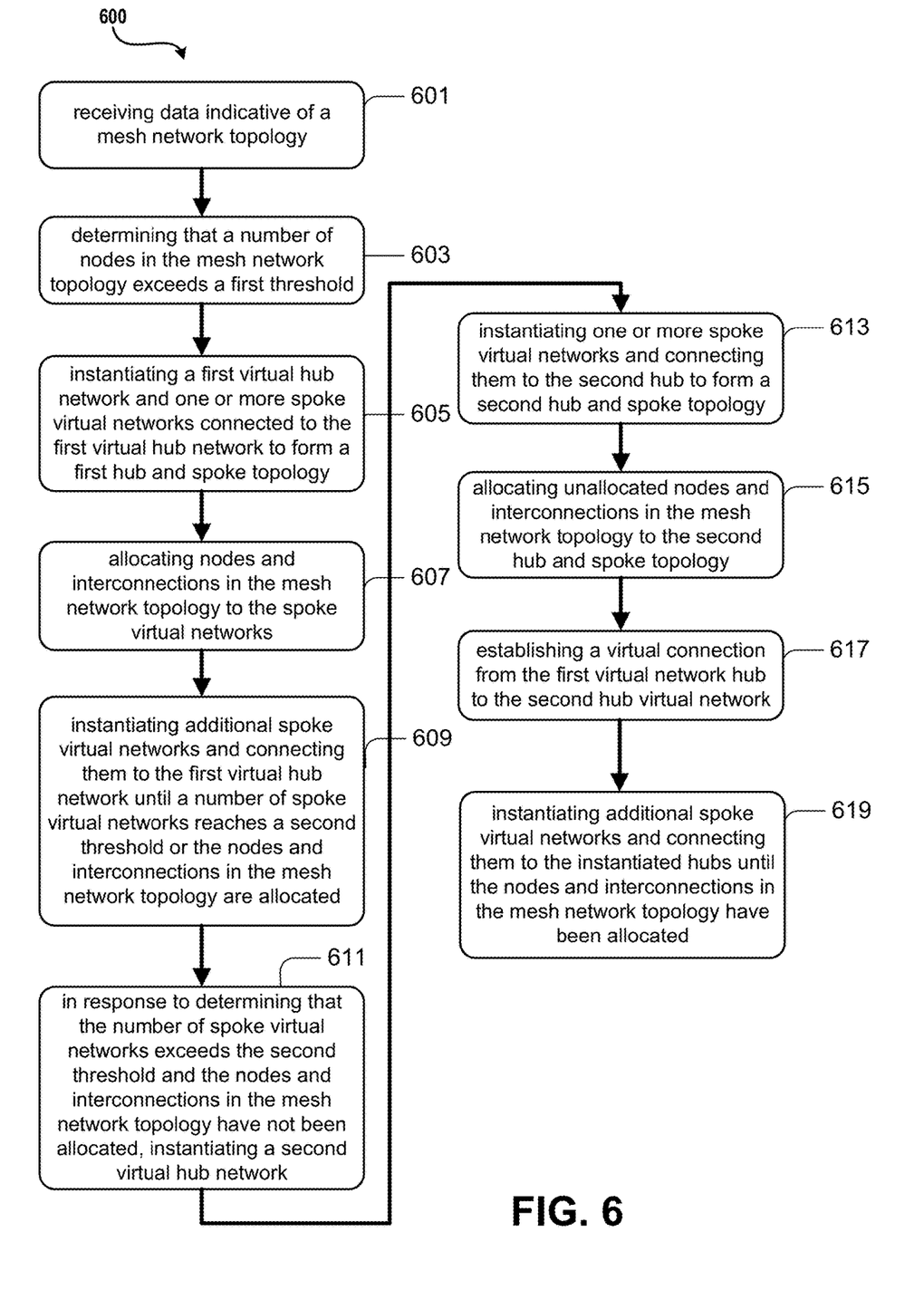
FIG. 6 is a flowchart depicting an example procedure for implementing a hub and spoke topology in accordance with the present disclosure.

Turning now to FIG. 6, illustrated is an example operational procedure for implementing networks in a virtualized computing environment in accordance with the present disclosure. The operational procedure may be implemented in a system comprising one or more computing devices. Referring to FIG. 6, operation 601 illustrates receiving data indicative of a mesh network topology to be implemented in the virtualized computing environment.

Operation 601 may be followed by operation 603. Operation 603 illustrates determining that a number of nodes in the mesh network topology exceeds a first threshold.

Operation 603 may be followed by operation 605. Operation 605 illustrates instantiating a first virtual hub network and one or more spoke virtual networks connected to the first virtual hub network to form a first hub and spoke topology.

Operation 605 may be followed by operation 607. Operation 607 illustrates allocating nodes and interconnections in the mesh network topology to the spoke virtual networks.

Operation 607 may be followed by operation 609. Operation 609 illustrates instantiating additional spoke virtual networks and connecting them to the first virtual hub network until a number of spoke virtual networks reaches a second threshold or the nodes and interconnections in the mesh network topology are allocated.

Operation 609 may be followed by operation 611. Operation 611 illustrates in response to determining that the number of spoke virtual networks exceeds the second threshold and the nodes and interconnections in the mesh network topology have not been allocated, instantiating a second virtual hub network.

Operation 611 may be followed by operation 613. Operation 613 illustrates instantiating one or more spoke virtual networks and connecting them to the second hub to form a second hub and spoke topology.

Operation 613 may be followed by operation 615. Operation 615 illustrates allocating unallocated nodes and interconnections in the mesh network topology to the second hub and spoke topology.

Operation 615 may be followed by operation 617. Operation 617 illustrates establishing a virtual connection from the first virtual network hub to the second hub virtual network.

Operation 617 may be followed by operation 619. Operation 619 illustrates instantiating additional spoke virtual networks and connecting them to the instantiated hubs until the nodes and interconnections in the mesh network topology have been allocated.

In an embodiment, a virtual connection from the second virtual hub network to a third virtual hub network is instantiated.

In an embodiment, the first and second thresholds are determined based on performance parameters of the virtualized computing environment.

In an embodiment, the first and second thresholds are dynamically determined based on performance objectives for the mesh network topology.

In an embodiment, allocation of the first and second hub and spoke networks to different lines of businesses is allowed.

In an embodiment, the first and second thresholds are determined in accordance with policies of the virtualized computing environment.

In an embodiment, additional virtual connections to additional virtual hub networks is instantiated.

In an embodiment, different security policies to the first and second hub and spoke topologies is allowed to be established.

In an embodiment, the first and second thresholds may be determined based on network conditions and/or desired performance criteria. For example, the first and/or second threshold may be determined based on a service level agreement for the user. The first and/or second threshold may also be determined based on a desired ratio of nodes and connections. The number of nodes connected to a spoke and the number of spokes in a hub network may be adjusted to provide a target performance in terms of bandwidth, response times, and other performance parameters. Alternatively, the thresholds may be set at a maximum level based on limits established for the computing environment.

Figure 7:
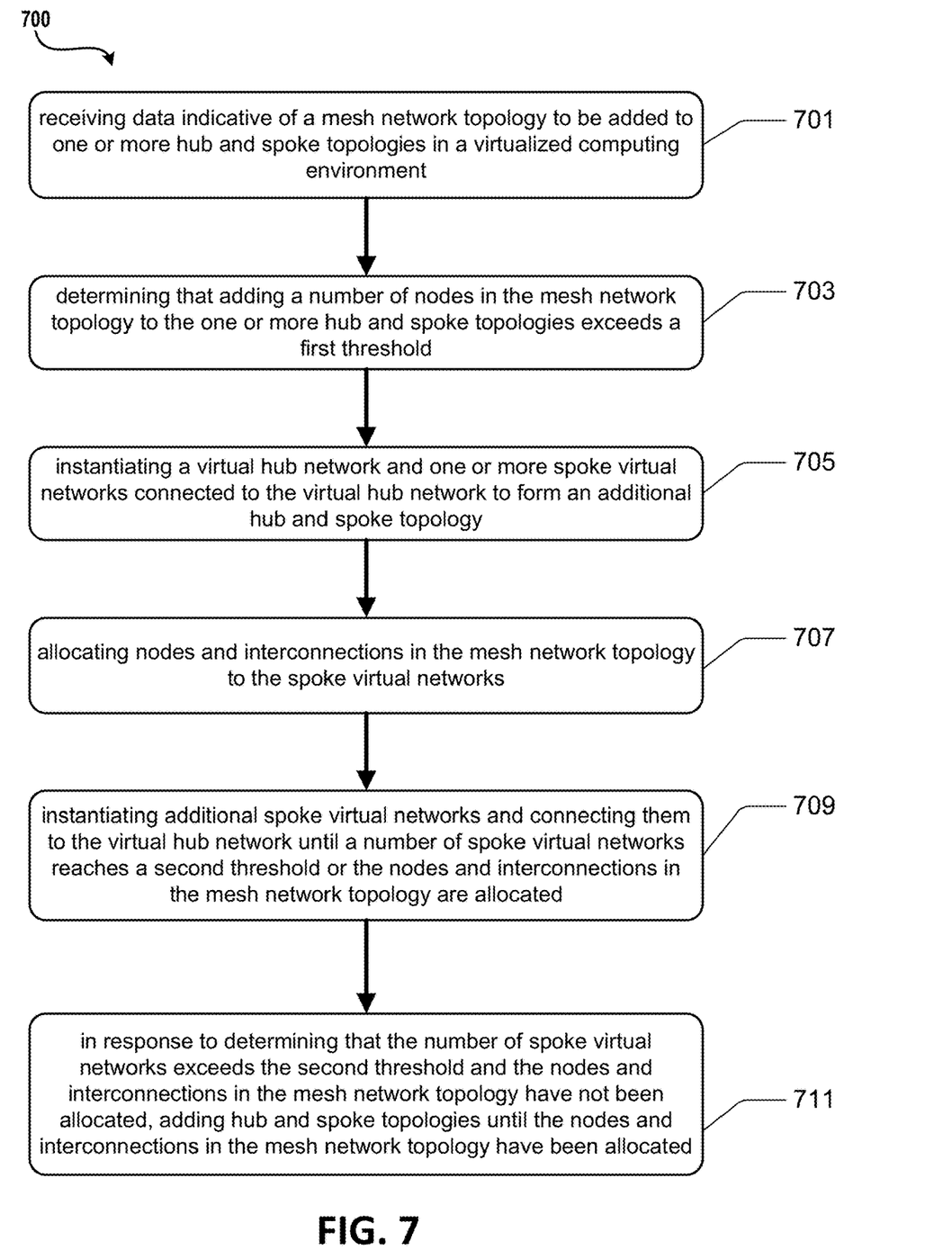
FIG. 7 is a flowchart depicting an example procedure for implementing a hub and spoke topology in accordance with the present disclosure.

Referring to FIG. 7, illustrated is another example operational procedure for implementing networks in a virtualized computing environment. The operational procedure may be implemented in a system comprising one or more computing devices. Referring to FIG. 7, operation 701 illustrates receiving data indicative of a mesh network topology to be added to one or more hub and spoke topologies in a virtualized computing environment.

Operation 701 may be followed by operation 703. Operation 703 illustrates determining that adding a number of nodes in the mesh network topology to the one or more hub and spoke topologies exceeds a first threshold.

Operation 703 may be followed by operation 705. Operation 705 illustrates instantiating a virtual hub network and one or more spoke virtual networks connected to the virtual hub network to form an additional hub and spoke topology.

Operation 705 may be followed by operation 707. Operation 707 illustrates allocating nodes and interconnections in the mesh network topology to the spoke virtual networks.

Operation 707 may be followed by operation 709. Operation 709 illustrates instantiating additional spoke virtual networks and connecting them to the virtual hub network until a number of spoke virtual networks reaches a second threshold or the nodes and interconnections in the mesh network topology are allocated.

Operation 709 may be followed by operation 711. Operation 711 illustrates instantiating additional spoke virtual networks and connecting them to the virtual hub network until a number of spoke virtual networks reaches a second threshold or the nodes and interconnections in the mesh network topology are allocated.

In an embodiment, deployment of one virtual network per project environment is allowed.

In an embodiment, the hub and spoke topologies are allowed to access one or more shared resources.

In an embodiment, Role-Based Access Control (RBAC) may be enabled to regulate access to resources based on the roles established by the user. Additionally, a combination of RBAC and policies may be used to reduce a number of virtual network peering links.

In an embodiment, the first and second thresholds are dynamically determined based on performance objectives for the mesh network topology.

In an embodiment, a maximum number of the spoke virtual networks in the first or second hub and spoke networks may be determined in accordance with policies of the virtualized computing environment.

In an embodiment, the user may be allowed to allocate the first and second hub and spoke networks to different lines of businesses.

In an embodiment, the mesh network may be mapped to a topologically equivalent network in the first and second hub and spoke networks.

Example Clauses

The disclosure presented herein may be considered in view of the following clauses.

Example Clause A, a method for implementing a network topology in a virtualized computing environment comprising a plurality of computing devices that are configured to host a plurality of virtual machines communicatively coupled via virtual networks, the method comprising:

receiving data indicative of a mesh network topology to be implemented in the virtualized computing environment;

determining that a number of nodes in the mesh network topology exceeds a first threshold;

instantiating a first virtual hub network and one or more spoke virtual networks connected to the first virtual hub network to form a first hub and spoke topology;

allocating nodes and interconnections in the mesh network topology to the spoke virtual networks;

instantiating additional spoke virtual networks and connecting them to the first virtual hub network until a number of spoke virtual networks reaches a second threshold or the nodes and interconnections in the mesh network topology are allocated;

in response to determining that the number of spoke virtual networks exceeds the second threshold and the nodes and interconnections in the mesh network topology have not been allocated, instantiating a second virtual hub network;

instantiating one or more spoke virtual networks and connecting them to the second hub to form a second hub and spoke topology;

allocating unallocated nodes and interconnections in the mesh network topology to the second hub and spoke topology;

establishing a virtual connection from the first virtual network hub to the second hub virtual network; and instantiating additional spoke virtual networks and connecting them to the instantiated hubs until the nodes and interconnections in the mesh network topology have been allocated.

Example Clause B, the method of Example Clause A, further comprising instantiating a virtual connection from the second virtual hub network to a third virtual hub network.

Example Clause C, the method of any one of Example Clauses A through B, wherein the first and second thresholds are determined based on performance parameters of the virtualized computing environment.

Example Clause D, the method of any one of Example Clauses A through C, wherein the first and second thresholds are dynamically determined based on performance objectives for the mesh network topology.

Example Clause E, the method of any one of Example Clauses A through D, further comprising allowing allocation of the first and second hub and spoke networks to different lines of businesses.

Example Clause F, the method of any one of Example Clauses A through E, wherein the first and second thresholds are determined in accordance with policies of the virtualized computing environment.

Example Clause G, the method of any one of Example Clauses A through F, further comprising instantiating additional virtual connections to additional virtual hub networks.

Example Clause H, the method of any one of Example Clauses A through G, further comprising allowing establishment of different security policies to the first and second hub and spoke topologies.

Example Clause I, a system, comprising:
one or more processors; and
a memory in communication with the one or more processors, the memory having computer-readable instructions stored thereupon that, when executed by the one or more processors, cause the system to perform operations comprising:
receiving data indicative of a mesh network topology to be added to one or more hub and spoke topologies in a virtualized computing environment;
determining that adding a number of nodes in the mesh network topology to the one or more hub and spoke topologies exceeds a first threshold;
instantiating a virtual hub network and one or more spoke virtual networks connected to the virtual hub network to form an additional hub and spoke topology;
allocating nodes and interconnections in the mesh network topology to the spoke virtual networks;
instantiating additional spoke virtual networks and connecting them to the virtual hub network until a number of spoke virtual networks reaches a second threshold or the nodes and interconnections in the mesh network topology are allocated; and
in response to determining that the number of spoke virtual networks exceeds the second threshold and the nodes and interconnections in the mesh network topology have not been allocated, adding hub and spoke topologies until the nodes and interconnections in the mesh network topology have been allocated.

Example Clause J, the system of Example Clause I, further comprising allowing deployment of one virtual network per project environment.

Example Clause K, the system of any one of Example Clauses I through J, further comprising allowing the hub and spoke topologies to access one or more shared resources.

Example Clause L, the system of any one of Example Clauses I through K, further comprising enabling Role-Based Access Control (RBAC) to regulate access to resources based on the roles established by the user.

Example Clause M, the system of any one of Example Clauses I through L, further comprising using a combination of RBAC and policies to reduce a number of virtual network peering links.

Example Clause N, the system of any one of Example Clauses I through M, wherein the first and second thresholds are dynamically determined based on performance objectives for the mesh network topology.

Example Clause O, the system of any one of Example Clauses I through N, wherein a maximum number of the spoke virtual networks in the hub and spoke networks is determined in accordance with policies of the virtualized computing environment.

Example Clause P, the system of any one of Example Clauses I through O, further comprising allowing allocation of the hub and spoke topologies to different lines of businesses.

Example Clause Q, a computer-readable storage medium having computer-executable instructions stored thereupon which, when executed by one or more processors of a computing device, cause the computing device to perform operations comprising:
determining that a number of nodes in a mesh network topology exceeds a first threshold;
causing a first virtual hub network and one or more spoke virtual networks connected to the first virtual hub network to be instantiated to form a first hub and spoke topology;
causing nodes and interconnections in the mesh network topology to be allocated to the spoke virtual networks;
causing additional spoke virtual networks to be instantiated and connecting them to the first hub until a number of spoke virtual networks reaches a second threshold or the nodes and interconnections in the mesh network topology are allocated;
in response to determining that the number of spoke virtual networks exceeds the second threshold and the nodes and interconnections in the mesh network topology have not been allocated, instantiating a second virtual hub network;
instantiating one or more spoke virtual networks and connecting them to the second hub to form a second hub and spoke topology;
allocating unallocated nodes and interconnections in the mesh network topology to the second hub and spoke topology;
establishing a virtual connection from the first virtual network hub to the second hub virtual network; and
instantiating additional spoke virtual networks and connecting them to the instantiated hubs until the nodes and interconnections in the mesh network topology have been allocated.

Example Clause R, the computer-readable storage medium of Example Clause Q, further comprising instantiating a virtual connection from the second virtual network hub to a third hub virtual network that includes a third central virtual network; and instantiating a virtual connection from the third virtual hub network to one or more spoke virtual networks to form a third hub and spoke topology.

Example Clause S, the computer-readable storage medium of any of Example Clauses Q through R, further comprising instantiating additional virtual connections to form additional hub and spoke networks.

Example Clause T, the computer-readable storage medium of any one of Example Clauses Q through S, wherein the mesh network topology is mapped to a topologically equivalent network in the first and second hub and spoke topologies.

The various aspects of the disclosure are described herein with regard to certain examples and embodiments, which are intended to illustrate but not to limit the disclosure. It should be appreciated that the subject matter presented herein may be implemented as a computer process, a computer-controlled apparatus, or a computing system or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures and other types of structures that perform particular tasks or implement particular abstract data types.

Those skilled in the art will also appreciate that the subject matter described herein may be practiced on or in conjunction with other computer system configurations beyond those described herein, including multiprocessor systems. The embodiments described herein may also be practiced in distributed computing environments, where tasks are performed by remote processing devices that are linked through a communications network. In a distributed computing environment, program modules may be located in both local and remote memory storage devices.

Networks established by or on behalf of a user to provide one or more services (such as various types of cloud-based computing or storage) accessible via the Internet and/or other networks to a distributed set of clients may be referred to as a service provider. Such a network may include one or more data centers such as data center 100 illustrated in FIG. 1, which are configured to host physical and/or virtualized computer servers, storage devices, networking equipment and the like, that may be used to implement and distribute the infrastructure and services offered by the service provider.

Figure 8:
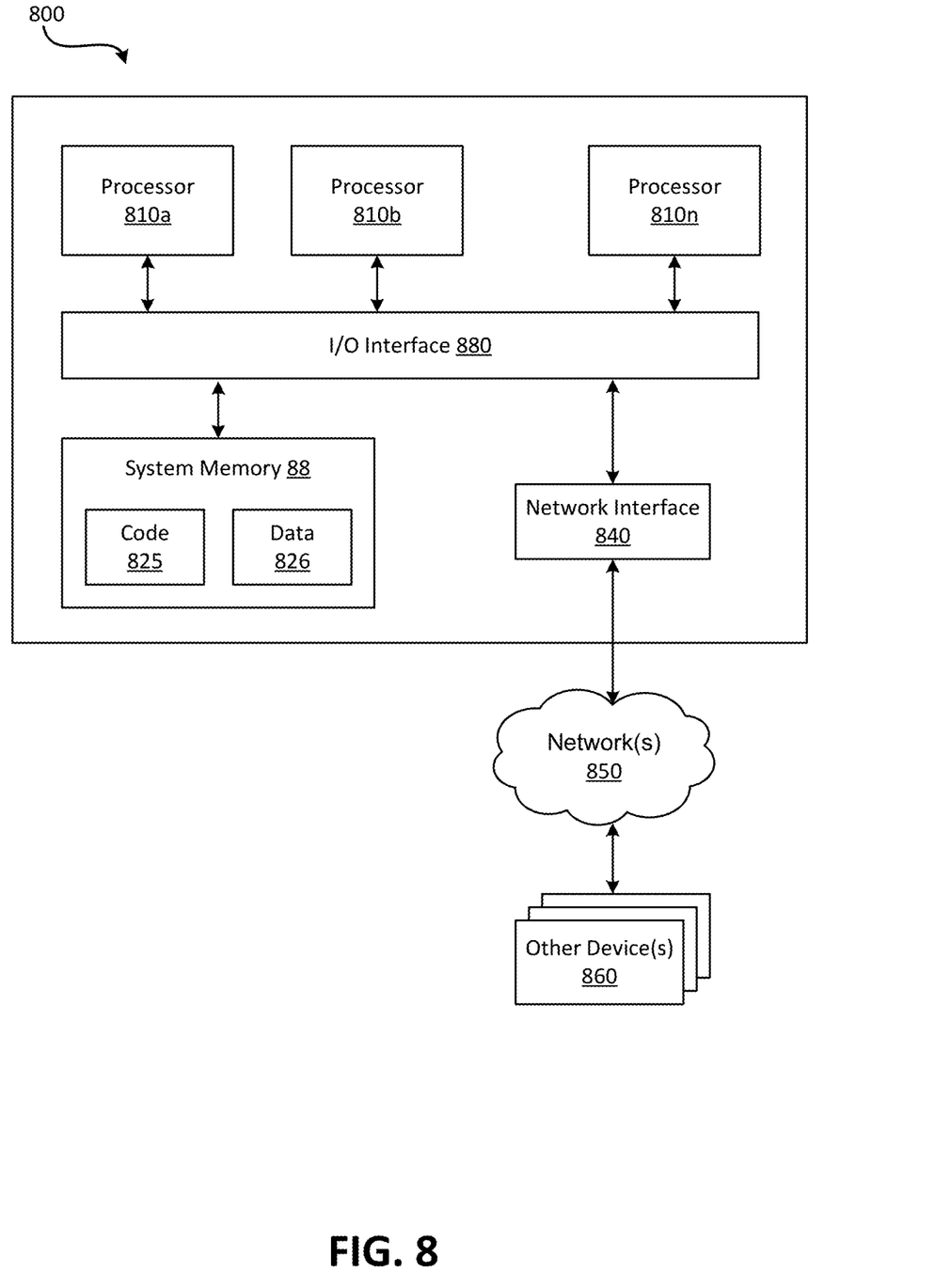
FIG. 8 is an example computing device in accordance with the present disclosure.

In some embodiments, a server that implements a portion or all of one or more of the technologies described herein, including the techniques to implement the capturing of network traffic may include a general-purpose computer system that includes or is configured to access one or more computer-accessible media. FIG. 8 illustrates such a general-purpose computing device 800. In the illustrated embodiment, computing device 800 includes one or more processors 810*a*, 810*b*, and/or 810*n* (which may be referred herein singularly as "a processor 810" or in the plural as "the processors 810") coupled to a system memory 88 via an input/output (I/O) interface 830. Computing device 800 further includes a network interface 840 coupled to I/O interface 830.

In various embodiments, computing device 800 may be a uniprocessor system including one processor 810 or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, PowerPC, SPARC, or MIPS ISAs, or any other suitable ISA. In multiprocessor systems, each of processors 810 may commonly, but not necessarily, implement the same ISA.

System memory 88 may be configured to store instructions and data accessible by processor(s) 810. In various embodiments, system memory 88 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 88 as code 825 and data 826.

In one embodiment, I/O interface 830 may be configured to coordinate I/O traffic between the processor 810, system memory 88, and any peripheral devices in the device, including network interface 840 or other peripheral interfaces. In some embodiments, I/O interface 830 may perform any necessary protocol, timing, or other data transformations to convert data signals from one component (e.g., system memory 88) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components. Also, in some embodiments some or all of the functionality of I/O interface 830, such as an interface to system memory 88, may be incorporated directly into processor 810.

Network interface 840 may be configured to allow data to be exchanged between computing device 800 and other device or devices 860 attached to a network or network(s) 850, such as other computer systems or devices as illustrated in FIGS. 1 through 4, for example. In various embodiments, network interface 840 may support communication via any suitable wired or wireless general data networks, such as types of Ethernet networks, for example. Additionally, network interface 840 may support communication via telecommunications/telephony networks such as analog voice networks or digital fiber communications networks, via storage area networks such as Fibre Channel SANs or via any other suitable type of network and/or protocol.

In some embodiments, system memory 88 may be one embodiment of a computer-accessible medium configured to store program instructions and data as described above for FIGS. 1-19 for implementing embodiments of the corresponding methods and apparatus. However, in other embodiments, program instructions and/or data may be received, sent or stored upon different types of computer-accessible media. A computer-accessible medium may include non-transitory storage media or memory media, such as magnetic or optical media, e.g., disk or DVD/CD coupled to computing device 800 via I/O interface 830. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 800 as system memory 88 or another type of memory. Further, a computer-accessible medium may include transmission media or signals such as electrical, electromagnetic or digital signals, conveyed via a communication medium such as a network and/or a wireless link, such as may be implemented via network interface 840. Portions or all of multiple computing devices, such as those illustrated in FIG. 8, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

Various storage devices and their associated computer-readable media provide non-volatile storage for the computing devices described herein. Computer-readable media as discussed herein may refer to a mass storage device, such as a solid-state drive, a hard disk or CD-ROM drive. However, it should be appreciated by those skilled in the art that computer-readable media can be any available computer storage media that can be accessed by a computing device.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computing devices discussed herein. For purposes of the claims, the phrase "computer storage medium," "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the disclosed computing devices in order to store and execute the software components and/or functionality presented herein. It is also contemplated that the disclosed computing devices may not include all of the illustrated components shown in FIG. 8, may include other components that are not explicitly shown in FIG. 8, or may utilize an architecture completely different than that shown in FIG. 8.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated any reference to "first," "second," etc. items and/or abstract concepts within the description is not intended to and should not be construed to necessarily correspond to any reference of "first," "second," etc. elements of the claims. In particular, within this Summary and/or the following Detailed Description, items and/or abstract concepts such as, for example, individual computing devices and/or operational states of the computing cluster may be distinguished by numerical designations without such designations corresponding to the claims or even other paragraphs of the Summary and/or Detailed Description. For example, any designation of a "first operational state" and "second operational state" of the computing cluster within a paragraph of this disclosure is used solely to distinguish two different operational states of the computing cluster within that specific paragraph—not any other paragraph and particularly not the claims.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A method for implementing a network topology in a virtualized computing environment comprising a plurality of computing devices that are configured to host a plurality of virtual machines communicatively coupled via virtual networks, the method comprising:

receiving data indicative of a mesh network topology to be implemented in the virtualized computing environment;

determining that a number of nodes in the mesh network topology exceeds a first threshold;

instantiating a first virtual hub network and one or more spoke virtual networks connected to the first virtual hub network to form a first hub and spoke topology;

allocating nodes and interconnections in the mesh network topology to the spoke virtual networks;

instantiating additional spoke virtual networks and connecting them to the first virtual hub network until a number of spoke virtual networks reaches a second threshold or the nodes and interconnections in the mesh network topology are allocated;

in response to determining that the number of spoke virtual networks exceeds the second threshold and the nodes and interconnections in the mesh network topology have not been allocated, instantiating a second virtual hub network;

instantiating one or more spoke virtual networks and connecting them to the second hub to form a second hub and spoke topology;

allocating unallocated nodes and interconnections in the mesh network topology to the second hub and spoke topology;

establishing a virtual connection from the first virtual network hub to the second hub virtual network; and instantiating additional spoke virtual networks and connecting them to the instantiated hubs until the nodes and interconnections in the mesh network topology have been allocated.

2. The method of claim 1, further comprising instantiating a virtual connection from the second virtual hub network to a third virtual hub network.

3. The method of claim 1, wherein the first and second thresholds are determined based on performance parameters of the virtualized computing environment.

4. The method of claim 1, wherein the first and second thresholds are dynamically determined based on performance objectives for the mesh network topology.

5. The method of claim 1, further comprising allowing allocation of the first and second hub and spoke networks to different lines of businesses.

6. The method of claim 1, wherein the first and second thresholds are determined in accordance with policies of the virtualized computing environment.

7. The method of claim 2, further comprising instantiating additional virtual connections to additional virtual hub networks.

8. The method of claim 1, further comprising allowing establishment of different security policies to the first and second hub and spoke topologies.

9. A system, comprising:
one or more processors; and
a memory in communication with the one or more processors, the memory having computer-readable instructions stored thereupon that, when executed by the one or more processors, cause the system to perform operations comprising:

receiving data indicative of a mesh network topology to be added to one or more hub and spoke topologies in a virtualized computing environment;

determining that adding a number of nodes in the mesh network topology to the one or more hub and spoke topologies exceeds a first threshold;

instantiating a virtual hub network and one or more spoke virtual networks connected to the virtual hub network to form an additional hub and spoke topology;

allocating nodes and interconnections in the mesh network topology to the spoke virtual networks;

instantiating additional spoke virtual networks and connecting them to the virtual hub network until a number of spoke virtual networks reaches a second threshold or the nodes and interconnections in the mesh network topology are allocated; and in response to determining that the number of spoke virtual networks exceeds the second threshold and the nodes and interconnections in the mesh network topology have not been allocated, adding hub and spoke topologies until the nodes and interconnections in the mesh network topology have been allocated.

10. The system of claim 9, further comprising allowing deployment of one virtual network per project environment.

11. The system of claim 9, further comprising allowing the hub and spoke topologies to access one or more shared resources.

12. The system of claim 9, further comprising enabling Role-Based Access Control (RBAC) to regulate access to resources based on the roles established by a user.

13. The system of claim 12, further comprising using a combination of RBAC and policies to reduce a number of virtual network peering links.

14. The system of claim 9, wherein the first and second thresholds are dynamically determined based on performance objectives for the mesh network topology.

15. The system of claim 9, wherein a maximum number of the spoke virtual networks in the hub and spoke networks is determined in accordance with policies of the virtualized computing environment.

16. The system of claim 9, further comprising allowing allocation of the hub and spoke topologies to different lines of businesses.

17. A non-transitory computer-readable storage medium having computer-executable instructions stored thereupon which, when executed by one or more processors of a computing device, cause the computing device to perform operations comprising:

determining that a number of nodes in a mesh network topology exceeds a first threshold;

causing a first virtual hub network and one or more spoke virtual networks connected to the first virtual hub network to be instantiated to form a first hub and spoke topology;

causing nodes and interconnections in the mesh network topology to be allocated to the spoke virtual networks;

causing additional spoke virtual networks to be instantiated and connecting them to the first hub until a number of spoke virtual networks reaches a second threshold or the nodes and interconnections in the mesh network topology are allocated;

in response to determining that the number of spoke virtual networks exceeds the second threshold and the nodes and interconnections in the mesh network topology have not been allocated, instantiating a second virtual hub network;

instantiating one or more spoke virtual networks and connecting them to the second hub to form a second hub and spoke topology;

allocating unallocated nodes and interconnections in the mesh network topology to the second hub and spoke topology;

establishing a virtual connection from the first virtual network hub to the second hub virtual network; and instantiating additional spoke virtual networks and connecting them to the instantiated hubs until the nodes and interconnections in the mesh network topology have been allocated.

18. The non-transitory computer-readable storage medium of claim 17, further comprising instantiating a virtual connection from the second virtual hub network to a third virtual hub network; and instantiating a virtual connection from the third virtual hub network to one or more spoke virtual networks to form a third hub and spoke topology.

19. The non-transitory computer-readable storage medium of claim 18, further comprising instantiating additional virtual connections to form additional hub and spoke networks.

20. The non-transitory computer-readable storage medium of claim 17, wherein the mesh network topology is mapped to a topologically equivalent network in the first and second hub and spoke topologies.

\* \* \* \* \*